United States Patent
Jones

(10) Patent No.: US 11,458,653 B1
(45) Date of Patent: Oct. 4, 2022

(54) DEVICES AND METHODS FOR DYNAMIC PIXEL MOLDING

(71) Applicant: Lucas Benjamin Jones, Lafayette, CO (US)

(72) Inventor: Lucas Benjamin Jones, Lafayette, CO (US)

(*) Notice: Subject to any disclaimer, the term of this patent is extended or adjusted under 35 U.S.C. 154(b) by 0 days.

(21) Appl. No.: 17/327,227

(22) Filed: May 21, 2021

(51) Int. Cl.
*B29C 33/38* (2006.01)

(52) U.S. Cl.
CPC ................. *B29C 33/3857* (2013.01)

(58) Field of Classification Search
CPC .................................... B29C 33/3857
See application file for complete search history.

(56) References Cited

U.S. PATENT DOCUMENTS

| 4,536,980 A | 8/1985 | Fleming | |
| 5,151,277 A * | 9/1992 | Bernardon | B29C 70/443 |
| | | | 249/161 |
| 5,330,343 A * | 7/1994 | Berteau | B28B 7/025 |
| | | | 249/161 |
| 6,780,352 B2 | 8/2004 | Jacobson | |
| 8,469,344 B2 * | 6/2013 | Halford | B23Q 3/00 |
| | | | 33/561.1 |
| 9,539,739 B2 * | 1/2017 | Ruthrauff | B28B 7/025 |
| 11,001,016 B2 * | 5/2021 | Vlavianos | B29C 33/02 |

* cited by examiner

*Primary Examiner* — James Sanders

(57) ABSTRACT

Systems and methods for reusable molding devices in accordance with embodiments of the invention are disclosed. In one embodiment, a reusable molding device is provided comprising: an array comprising a plurality of pixel pins, which are arranged to form a two-dimensional plane and which are each linearly movable to create an impression of a surface of an object, a first pixel guide plate, a second pixel guide plate, a first clamp pressure plate, a second clamp pressure plate, a first clamp screw, wherein the first clamp screw moves the first clamp pressure plate towards the first side of the array, a second clamp screw which moves the second clamp pressure plate towards the second side of the array, a pressure clamp frame enclosing the first and second pixel guide plates and the first and second clamp pressure plates, and a top pressure plate, which includes an injection entrance bore.

10 Claims, 15 Drawing Sheets

DEVICES AND METHODS FOR DYNAMIC PIXEL MOLDING

FIELD OF THE INVENTION

The present invention generally relates to molding devices and more specifically to devices and methods for reusable molding.

BACKGROUND

Molding may include the manufacture process in which a pliable material is shaped using a rigid frame. This frame is what comprises the "mold" and is often a hollow container into which a molding material may be inserted.

Molding technology is often used in thermoforming manufacturing processes, where a plastic sheet is heated to a pliable forming temperature, formed to a specific shape in a mold, and trimmed to make a usable product. Additionally, molding technology is relevant in Styrofoam manufacturing processes, where a mold is used to shape Styrofoam sheets into the desired shape for packaging purposes.

SUMMARY OF THE INVENTION

The various embodiments of the present reusable molding device include several features, no single one of which is solely responsible for their desirable attributes. Without limiting the scope of the present embodiments, their more prominent features will be discussed below. In particular, the present molding devices will be discussed in the context of prototyping. However, the use of prototyping is merely exemplary and molding devices may be utilized in various other contexts as appropriate to the requirements of a specific application, in accordance with various embodiments of the invention. After considering this discussion, and particularly after reading the section entitled "Detailed Description," one will understand how the features of the present embodiments provide the advantages described here.

One aspect of the present embodiments includes the realization that traditionally, three-dimensional printing technology and one-time injection molding designs were used as the conventional molding technology to create molds of objects in manufacturing industries. Generally, the standard molding process involved cutting metal molds using industrial machining equipment to achieve a negative impression of the desired molded object, or printing the desired object to be molded using a three-dimensional printer, then impressing the three-dimensional object into a mold, thus creating a set mold for that object. The issue with this conventional method is that each mold is only designed to create the specific object molded and cannot be reused to create other objects. Additionally, the process of creating a single mold can be costly and time consuming because the process often entails specialized industrial machining equipment used to cut and shape various metals to create a mold, or the use of three-dimensional printing technology to first create a model of the object from which to create the mold, among other costs.

Another aspect of the present embodiments includes the realization that a reusable molding device is an uncommon approach to creating molds for use in manufacturing processes because such a device can be calibrated and re-calibrated to create a mold for any desired object. A reusable molding device is not limited to only creating a mold for a single object but can be reset and reused to create moldings for multiple objects. Such a device is more cost effective in the manufacturing process and can potentially eliminate the need to utilize three-dimensional printing technology as part of the mold-creating process.

In a first aspect, a reusable molding device for producing three-dimensional (3D) molds is provided, the reusable molding device comprising an array, comprising a plurality of pixel pins, wherein the plurality of pixel pins is arranged to form a two-dimensional plane and wherein each one of the plurality of pixel pins is linearly movable to create an impression of a surface of an object, a first pixel guide plate connected to the array, wherein the first pixel guide plate provides support to a first side of the array, a second pixel guide plate connected to the array, wherein the second pixel guide plate supports a second side of the array, wherein the second side of the array is adjacent to the first side of the array, a first clamp pressure plate configured to apply pressure to a third side of the array, wherein the first clamp pressure plate is opposite the first pixel guide plate, a second clamp pressure plate configured to apply pressure to a fourth side of the array, wherein the second clamp pressure plate is opposite the second pixel guide plate, a first clamp screw connected to the first clamp pressure plate, wherein the first clamp screw moves the first clamp pressure plate in a first direction towards the first side of the array and moves in an opposite second direction away from the first side of the array, a second clamp screw connected to the second clamp pressure plate, wherein the second clamp screw moves the second clamp pressure plate in a third direction towards the second side of the array and moves in an opposite fourth direction away from the second side of the array, a pressure clamp frame enclosing the first and second pixel guide plates and the first and second clamp pressure plates, wherein the pressure clamp frame is connected to the first clamp screw, the second clamp screw, and the clamp guide block, and a top pressure plate connected to the pressure clamp frame, wherein the top pressure plate includes an injection entrance bore through which to pour in a molding material.

In an embodiment of the first aspect, each pixel pin of the plurality of pixel pins is a prism to fit tightly next to its surrounding pixel pins.

In another embodiment of the first aspect, each pixel pin of the plurality of pixel pins is of varying sizes to fit tightly next to its surrounding pixel pins.

In another embodiment of the first aspect, the array and the top pressure plate are separated by a mold volume diaphragm.

In another embodiment of the first aspect, the reusable molding device further includes a first pressure release stop pin connected to the first clamp pressure plate.

In another embodiment of the first aspect, the reusable molding device further includes a second pressure release stop pin connected to the second clamp pressure plate.

In another embodiment of the first aspect, the reusable molding device further includes a clamp guide block for controlling the linear movement of the first clamp pressure plate and the second clamp pressure plate, wherein the guide block is between the first clamp pressure plate and the second clamp pressure plate.

In another embodiment of the first aspect, the reusable molding device further includes a clamp guide block bracket connected to the clamp guide block, wherein the clamp guide block bracket is secured by at least one bracket screw.

In another embodiment of the first aspect, the reusable molding device further includes at least one frame corner bracket, wherein the at least one frame corner bracket is connected to the pressure clamp frame.

In another embodiment of the first aspect, the top pressure plate is removable.

In a second aspect, a method for creating a temporary and reusable mold of an object is provided, the method comprising receiving an object into a pixel pin array ("array") comprising a plurality of pixel pins, wherein the pixel pins are linearly displaced by the object, temporarily setting the array in place by clamping the array between pixel guide plates and clamp pressure plates, releasing the object, wherein releasing the object leaves a mold volume impression on the array, connecting a top pressure plate to a frame enclosing the pressure and guide plates, injecting a molding material through an injection entrance bore located in the top pressure plate, setting the molding material, wherein setting the molding material results in a molded object, and removing the top pressure plate and the molded object.

In an embodiment of the second aspect, the method further comprises resetting the array to a neutral position by pressing the plurality of pixel pins into a 2-dimensional plane.

In another embodiment of the second aspect, the method further comprises releasing pressure in the clamp pressure plates using the clamp screws and clamp screw locknuts, and controlling a minimum pressure of the clamp pressure plates using pressure release stop pins secured by pressure release stop pin locknuts.

In another embodiment of the second aspect, the method further comprises inserting a mold volume diaphragm between the top pressure plate and a mold volume thus enclosing the mold volume between the array and the top pressure plate.

In another embodiment of the second aspect, the mold volume diaphragm prevents the molding material from entering into voids between each of the plurality of pixel pins in the array.

In another embodiment of the second aspect, the mold volume diaphragm reduces impressions left in the molding material caused by the plurality of pixel pins.

In another embodiment of the second aspect, the mold volume diaphragm smooths the interface of the mold volume and the array.

In another embodiment of the second aspect, each of the plurality of pixel pins is linearly adjusted after the removal of the object.

In another embodiment of the second aspect, clamp screws apply pressure to the clamp pressure plates to move the pressure plate linearly along a clamp guide block.

In another embodiment of the second aspect, the top pressure plate is connected to the device using top pressure plate screws.

BRIEF DESCRIPTION OF THE DRAWINGS

The various embodiments of the present reusable molding device now will be discussed in detail with an emphasis on highlighting the advantageous features. These embodiments depict the novel and non-obvious reusable molding device shown in the accompanying drawings, which are for illustrative purposes only. These drawings include the following figures.

DETAILED DESCRIPTION OF THE DRAWINGS

Figure 1:
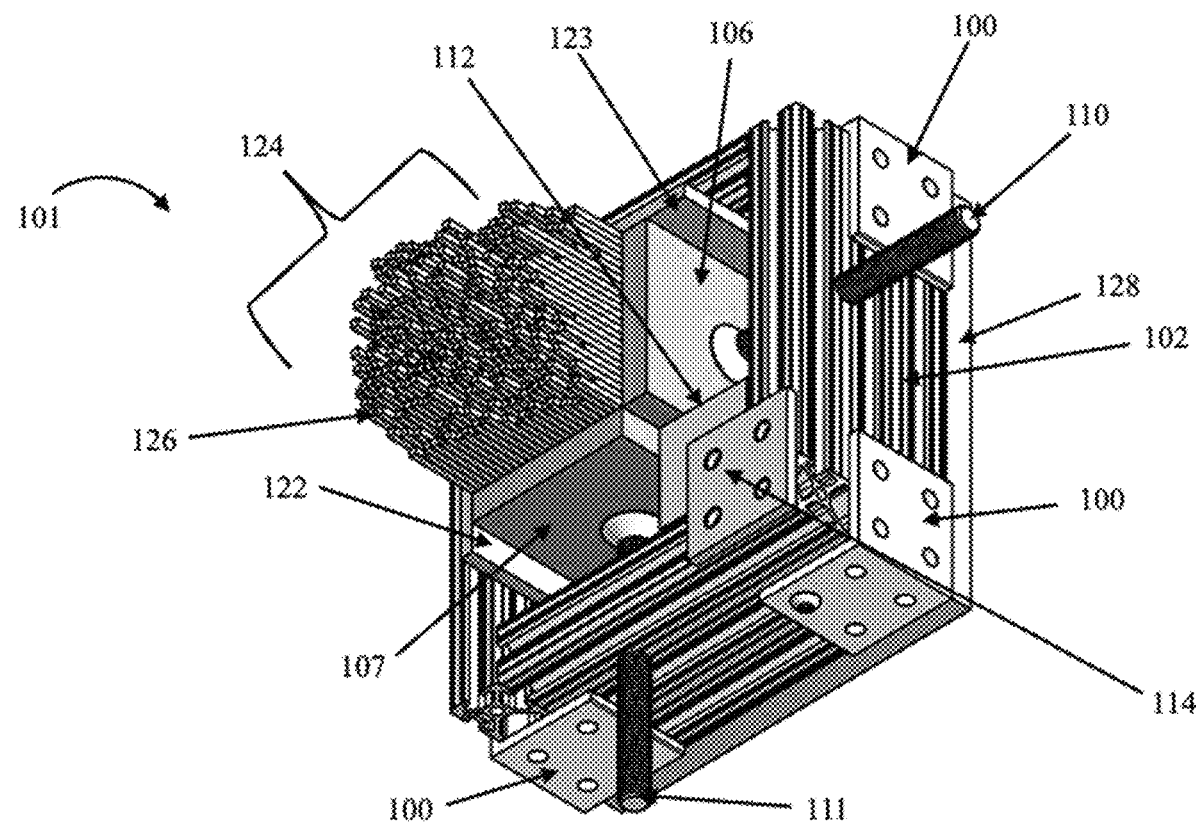
FIG. 1 is an isometric view of a reusable molding device in accordance with an embodiment of the invention.

The following detailed description describes the present embodiments with reference to the drawings. In the drawings, reference numbers label various elements of the present embodiments. These reference numbers are reproduced below in connection with the discussion of the corresponding drawing features.

Turning now to the drawings, the device and methods for reusable molding devices in accordance with embodiments of the invention are disclosed. In many embodiments, reusable molding devices may include an array that includes a plurality of pixel pins that may be connected to a first pressure plate and an adjacent second pressure plate to create a mold volume of an object, which may then be filled by a molding material injected into the molding devices. In various embodiments, the reusable molding devices may also include a mold volume diaphragm to act as a barrier between the molding material and the array. In many embodiments, each pressure plate may be connected to a pressure plate clamp to control the amount of pressure exerted and/or released from its corresponding pressure plate to either secure the plurality of pixel pins in its adjusted position or to reconfigure the plurality of pins into neutral position, as further described below. In several embodiments, reusable molding devices may also include a first pressure release stop pin, connected to a side of a pressure clamp frame, and a second pressure release stop pin, connected to an adjacent side of the pressure clamp frame, to limit the amount of pressure released from the first and second pressure plates, respectively.

In many embodiments, methods for setting reusable molding devices may be utilized to create mold volumes of an object. For example, methods may include receiving an object into the pixel pin array. In various embodiments, the pixel pins of the molding device may be individually adjusted without inserting the object, or simply after insertion, as needed. Methods may further include temporarily setting molding devices using clamps to ensure that the pins do not move from their adjusted position. In several embodiments, adding a top pressure plate may enclose the mold volume and a molding material may be injected into the molding device. In a variety of embodiments, methods may include adding a mold volume diaphragm that acts as a barrier between the molding material and the array. In many embodiments, once the molding material is set, the molded object may be removed and the pins may be reset to a neutral position. Thus, the molding device may be ready to receive a new object or further adjustments. The reusable molding devices in accordance with embodiments of the invention is further discussed below.

Reusable Molding Devices

Reusable molding devices may include an array of pixel pins and a plurality of clamp pressure plates in various configurations for creating molds. An isometric view of a reusable molding device in accordance with an embodiment of the invention is illustrated in FIG. 1. In various embodiments, the reusable molding device 101 may include an array 124 that includes a plurality of individual pixel pins 126 that may be configured to move linearly to create a mold. In many embodiments, the array 124 may be connected to a first pixel guide plate 122 and a second pixel guide plate 123 to retain the array 124 when using the molding device 101 to create a mold. In some embodiments, the first pixel guide plate 122 may be positioned adjacent to the second pixel guide plate 123. In numerous embodiments, the array 124 may also be connected to a first clamp pressure plate 106 and a second clamp pressure plate 107, both of which may apply pressure to their respective sides of the array 124 to secure the placement of the individual pixel pins 126 after a mold impression has been created, as further described below. In some embodiments, the first clamp pressure plate 106 may be positioned adjacent to the second clamp pressure plate 107.

In reference to FIG. 1, a first clamp screw 110 may be connected to the first clamp pressure plate 106 to control the amount of pressure applied or released on the first clamp pressure plate 106. For example, pressure may be applied to the first clamp pressure plate 106 by tightening the first clamp screw 110. In some embodiments, applying pressure to the first clamp pressure plate 106 may apply pressure to the array 124. Further, pressure may be released on the first clamp pressure plate 106 by loosening the first clamp screw 110. In many embodiments, releasing pressure on the first clamp pressure plate 106 may release pressure on the array 124. In addition, in various embodiments, a second clamp screw 111 may be connected to the second clamp pressure plate 107 to control the amount of pressure applied or released on the second pressure plate 107. For example, pressure may be applied to the second clamp pressure plate 107 by tightening the second clamp screw 111. In some embodiments, applying pressure to the second clamp pressure plate 107 may apply pressure to the array 124. Further, pressure may be released on the second clamp pressure plate 107 by loosening the second clamp screw 111. In some embodiments, releasing pressure on the second clamp pressure plate 107 may release pressure on the array 124. In numerous embodiments, the molding device 101 may also include a clamp guide block 112, located between the first clamp pressure plate 106 and the second clamp pressure plate 107, to control the linear movement of the first clamp pressure plate 106 and the second clamp pressure plate 107. In some embodiments, the clamp guide block 112 may be secured by a clamp guide block bracket 114. In several embodiments, the molding device 101 may also include a pressure clamp frame 102, secured by a plurality of frame corner brackets 100 with a plurality of frame screws 104, that encloses the array 124 and supports the first clamp screw 110, and the second clamp screw 111. The molding device 101 may also include a removable top pressure plate 128 connected to the pressure clamp frame 102.

Figure 2:
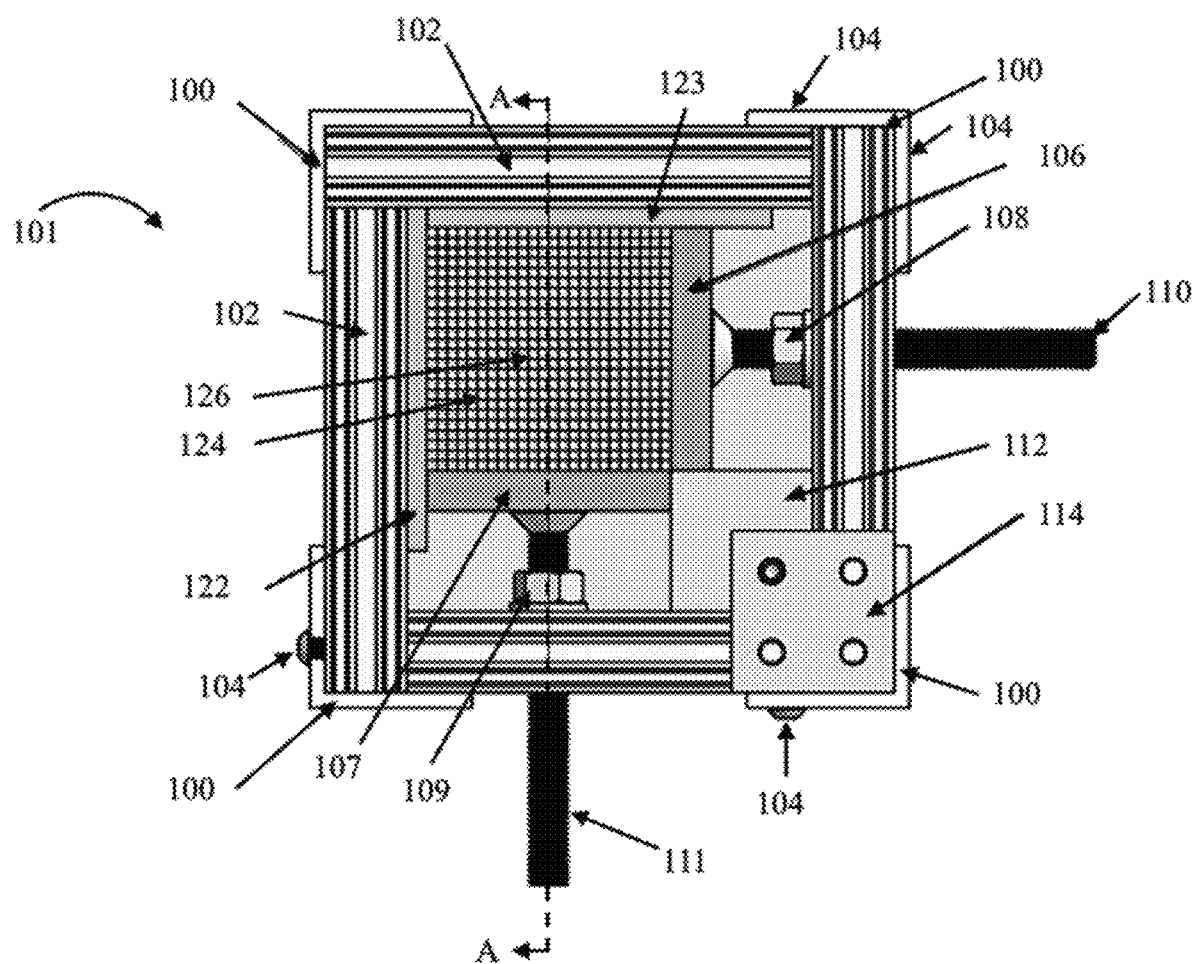
FIG. 2 is a bottom view of the reusable molding device in accordance with an embodiment of the invention.

A bottom view of the reusable molding device, along an A-A axis in accordance with an embodiment of the invention is illustrated in FIG. 2. In many embodiments, the array 124 of the reusable molding device 101 may be configured in a neutral position where the individual pins 126 are aligned to make the array 124 flat and planar. Additionally, in various embodiments, the array 124 may be configured in a shifted position where the individual pixel pins 126 are aligned at varying levels to create a mold impression in the array 124 of an object. The individual pixel pins 126 may be shifted as a result of an object being impressed into the array 124 in order to create a negative image of the side of the object impressed. Furthermore, the individual pixel pins 126 may be electronically calibrated into a shifted position to create a negative image of one side of the object. The negative image created from the shifted position of the individual pixel pins 126 may be an image of a portion or side of an object and does not necessarily create an entire negative image of the object. The individual pixel pins 126 may be of varying sizes, thickness, and shape to maximize surface area of the array 124. For example, the array 124 may include individual pixel pins 126 that are angular in shape or circular in shape. The individual pins 126 may be of conventional material, including, but not limited to, plastic material, to, for instance, avoid rusting, or metal material, such as stainless steel. In several embodiments, the first pixel guide plate 122 and the second pixel guide plate 123 may be stationary to keep the array 124 secure. In various embodiments, the first clamp screw 110 may be connected by a first clamp screw locknut 108 to regulate the amount of pressure the first clamp screw 110 applies to the first clamp pressure plate 106. Furthermore, the second clamp screw 111 may be connected to a second clamp screw locknut 109 to regulate the amount of pressure the second clamp screw 111 applies to the second clamp pressure plate 107. In many embodiments, the clamp guide block 112, secured by the clamp guide block bracket 114 using a plurality of bracket screws 116, may be stationary to guide the respective linear movements of the first clamp pressure plate 106 and the second clamp pressure plate 107. In various embodiments, the pressure clamp frame 102, which may be secured by a plurality of frame corner brackets 100 with a plurality of frame screws 104, may further enclose the first pixel guide plate 122, the second pixel guide plate 123, the first clamp pressure plate 106, the second clamp pressure plate 107, and the clamp guide block 112.

Figure 3:
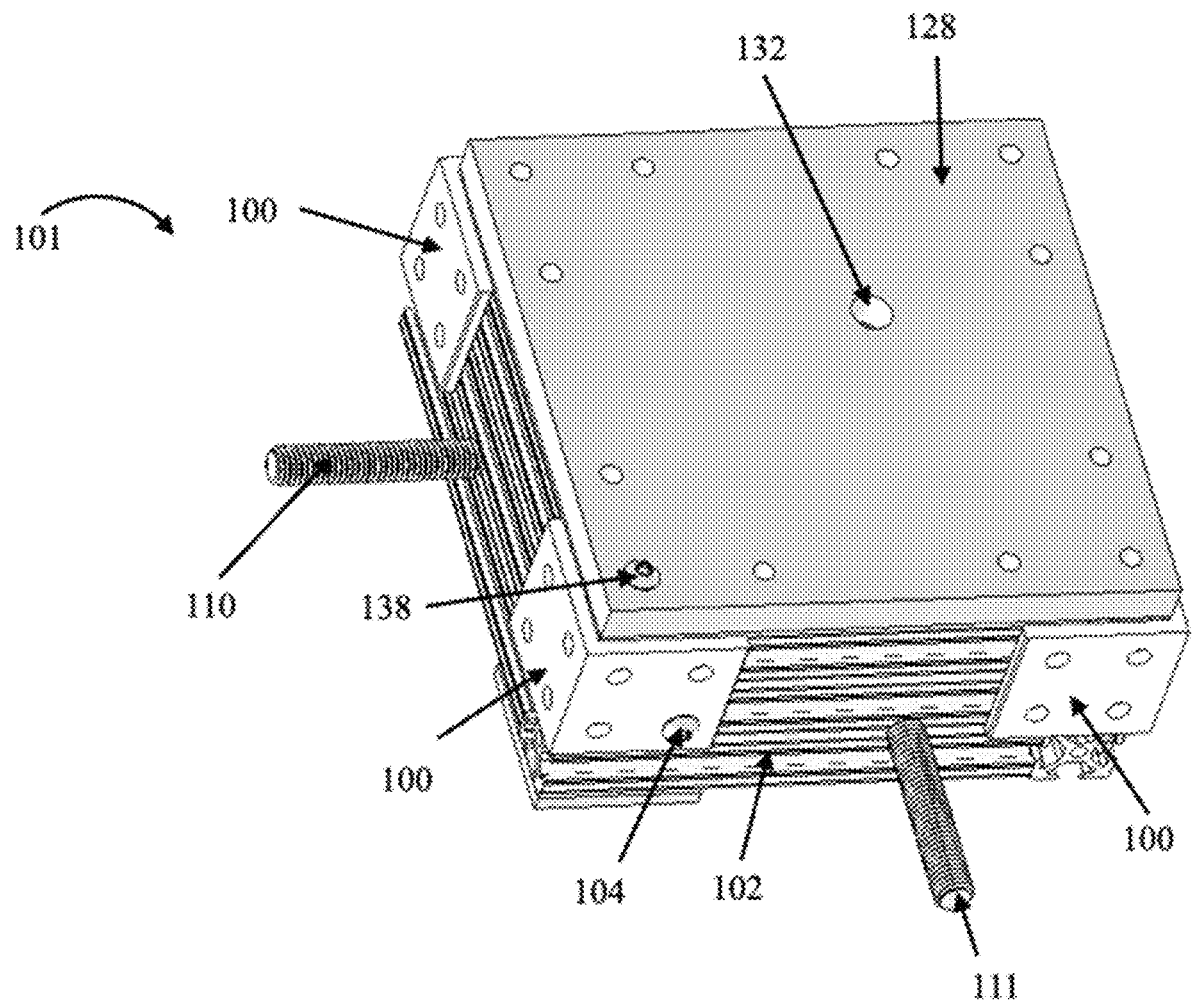
FIG. 3 is a top perspective of the reusable molding device, in accordance with an embodiment of the invention.

A top perspective view of the reusable molding device in accordance with an embodiment of the invention is illustrated in FIG. 3. In many embodiments, the top pressure plate 128 may be connected to the pressure clamp frame 102 with a plurality of top pressure plate screws 138. The top pressure plate 128 may include an injection entrance bore 132, through which molding material may enter the molding device 101. In numerous embodiments, the top pressure plate 128 may be removed from the pressure clamp frame 102 to insert an object into the array to create an impression of the object in the array. In several embodiments, once an impression is made, the object may be removed from the array and the top pressure plate 128 may be reconnected to the pressure clamp frame 102 with a plurality of top pressure plate screws 138 to close the top side of the molding device 101. In some embodiments, molding material may be injected through the injection entrance bore 132 and fill the negative space in the array created by the impression of the object. In many embodiments, the top pressure plate 128, however, may not be connected to any of the plurality of frame corner brackets 100, which may be connected to the pressure clamp frame 102 with the plurality of frame screws 104. In various embodiments, when the top pressure plate 128 is attached to the pressure clamp frame 102, the first clamp screw 110 and the second clamp screw 111 may not be movable.

Although specific reusable molding devices are discussed above with respect to FIGS. 1-3, any of the variety of reusable molding devices, including a variety of array, clamp screw, pressure plate, and guide plate positions, as appropriate to the requirements of a specific application can be utilized in accordance with embodiments of the invention. Cross-sectional views, along the A-A axis, of the reusable molding device, in accordance with embodiments of the invention are further discussed below.

Internal Mechanics of Reusable Molding Devices

Figure 4A:
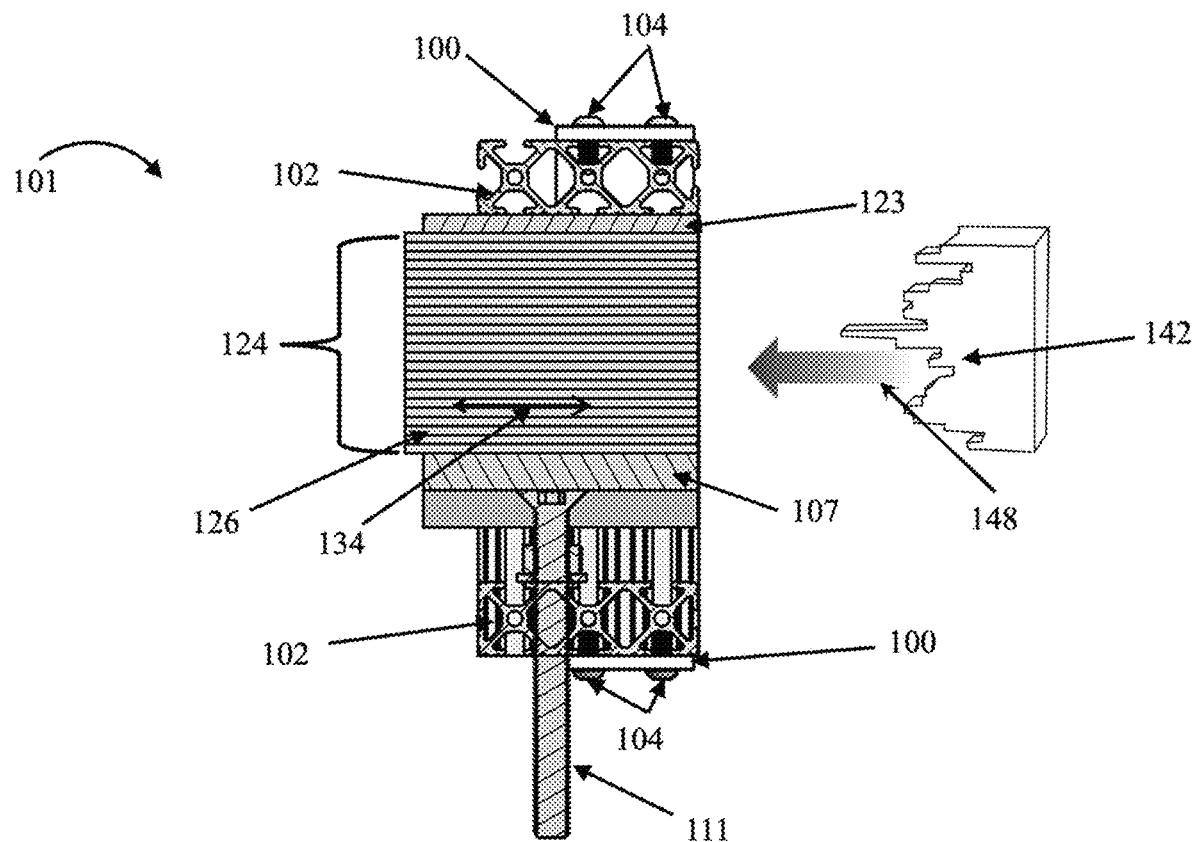
FIG. 4A is a cross-sectional view, along an A-A axis, of the reusable molding device, with the array of pixel pins in a neutral position, in accordance with an embodiment of the invention.

In many embodiments, molding devices may be utilized by moving pixel pins, inserting an object, and attaching a top pressure plate. A cross-sectional view of a reusable molding device, with the array in a neutral position, in accordance with an embodiment of the invention is depicted in FIG. 4A. As illustrated, the cross-sectional view may be along the A-A axis (see FIG. 2). In several embodiments, the molding device 101 may be bounded by the pressure clamp frame 102 which may be held together by a plurality of frame corner brackets 100. In numerous embodiments, the plurality of frame corner brackets 100 may be connected to the pressure clamp frame 102 by screwing in the plurality of frame screws 104 for each of the frame corner brackets 100. In various embodiments, the second clamp screw 111 may be slotted through the pressure clamp frame 102 to extend from outside the pressure clamp frame 102 to inside the pressure clamp frame 102 towards the center of the molding device 101. In some embodiments, the second clamp screw 111 may extend through the pressure clamp frame 102 and come into contact with the second clamp pressure plate 107. In many embodiments, the second clamp pressure plate 107 may interface with the array 124 and the second clamp screw 111. For example, the second clamp pressure plate 107 may interface with the array 124 on one side and the second clamp screw 111 on an opposite side of the second clamp pressure plate 107. In other words, the array 124, which may be made up of the plurality of individual pixel pins 126, may be on the opposite side of the second clamp pressure plate 107 than the side which may contact the second clamp screw 111. In several embodiments, the array 124 may be placed in a neutral position, whereby each individual pixel pin 126 may be positioned flush with the other pixel pins 126. For example, the individual pins 126 may be aligned to make the array 124 flat and planar. In various embodiments, on the opposite side of the array 124, that is opposite to where the array 124 may interface with the second clamp pressure plate 107, the array 124 may further interface with the second pixel guide plate 123. In some embodiments, the second pixel guide plate 123 may interface with another portion of the pressure clamp frame 102 on an opposite side to the second pixel guide plate's 123 connection with the array 124. In many embodiments, the individual pixel pins 126, the second clamp pressure plate 107, the second pixel guide plate 123, and the pressure clamp frame 102 may be parallel to each other. In several embodiments, an object 142 may be received into the array 124 thus moving the individual pixel pins 126 in a linear movement 134. For example, the object 142 may be received by the molding device 101 such that the linear movement 134 of the individual pixel pins 126 may make an impression of the object 142, as further described below. In various embodiments, the object 142 may be received 148 into the array 124, as further described below.

Figure 4B:
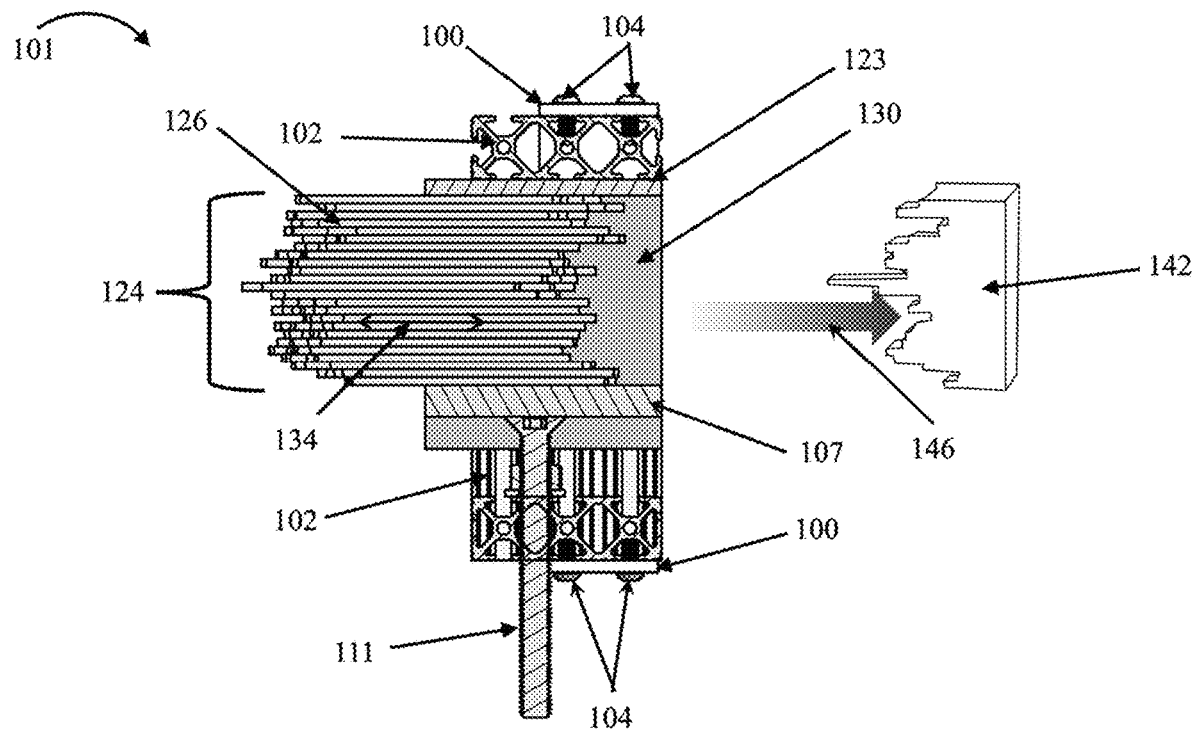
FIG. 4B is a cross-sectional view, along the A-A axis, of the reusable molding device, with the array of pixel pins in a shifted position, in accordance with an embodiment of the invention.

A cross-sectional view of a reusable molding device, with the array in a shifted position, in accordance with an embodiment of the invention is depicted in in FIG. 4B. As illustrated, the cross-sectional view may be along the A-A axis (see FIG. 2). In many embodiments, the plurality of frame corner brackets 100, the pressure clamp frame 102, the plurality of frame screws 104, the second clamp pressure plate 107, the second clamp screw 111, and the second pixel guide plate 123 may be positioned as discussed above in FIG. 4A. In reference to FIG. 4B, the array 124 may be positioned into a shifted position, whereby each individual pixel pin 126 may be shifted relative to the other pixel pins 126, as further described below. In several embodiments, the individual pixel pins 126 may be individually shifted linearly 134. In many embodiments the individual pixel pins 126 may be shifted linearly 134 based on the shape of the object 142 received by the molding device 101. For example, when the object 142 is received, the contours of the object 142 may cause a shift of individual pixel pins 126 to varying extents along their axes of linear movement 134. In many embodiments, the varying extent of shift by the individual pixel pins 126 may collectively allow for creating an impression of the object 142 by the array 124, as further described below. In several embodiments, the object 142 may be removed 146 from the array 124, creating a mold volume 130 of the impression of the object, as further described below.

Figure 4C:
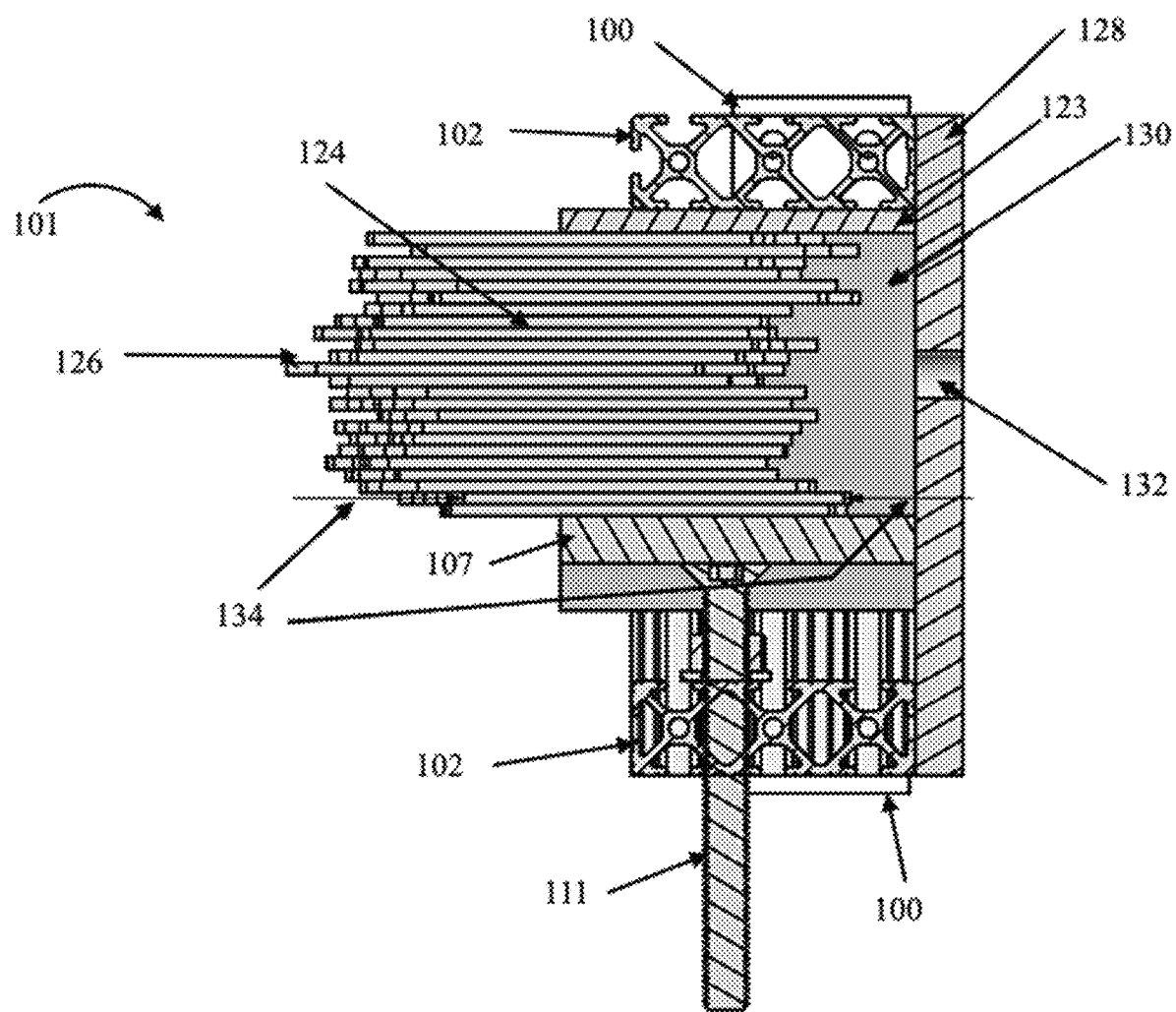
FIG. 4C is a cross-sectional view, along the A-A axis, of the reusable molding device, with the top plate connected, in accordance with an embodiment of the invention.

A cross-sectional view of a reusable molding device, with the array in a shifted position and the top pressure plate in place, in accordance with an embodiment of the invention is depicted in FIG. 4C. As illustrated, the cross-sectional view may be along the A-A axis (see FIG. 2). The plurality of frame corner brackets 100, the pressure clamp frame 102, the second clamp pressure plate 107, the second clamp screw 111, and the second pixel guide plate 123 may all be in a similar position relative to each other as discussed above in FIG. 4A. In many embodiments, the array 124 may be positioned in a shifted position, as discussed above in FIG. 4B. In reference to FIG. 4C, the molding device 101 may include a top pressure plate 128. In some embodiments, the top pressure plate 128 may be connected to the molding device 101 perpendicular to the linear pixel pin movement 134, thus enclosing the mold volume 130. In several embodiments, the mold volume 130 may be made up of the space between the top pressure plate 128, the shifted individual pixel pins 126 in the array 124, the first pixel guide plate, the second pixel guide plate 123, the first clamp pressure plate, and second clamp pressure plate 107. In many embodiments, the mold volume 130 may be filled with a molding material such as, but not limited to, a thermosetting polymer material (e.g., a thermoplastic polymer, etc.), as further described below. In various embodiments, the top pressure plate 128 may include an injection entrance bore 132 for receiving the molding material.

Although specific configurations and uses of reusable molding devices are discussed above with respect to FIGS. 4A-4C, any of a variety of configurations including a variety of array, clamp screw, pressure plate, and guide plate positions, as appropriate to the requirements of a specific application, may be used in accordance with embodiments of the invention. Reusable molding devices using diaphragm and pressure release stop pins in accordance with embodiments of the invention, are further discussed below.

Reusable Molding Devices With Pressure Release Stop Pins

Figure 5:
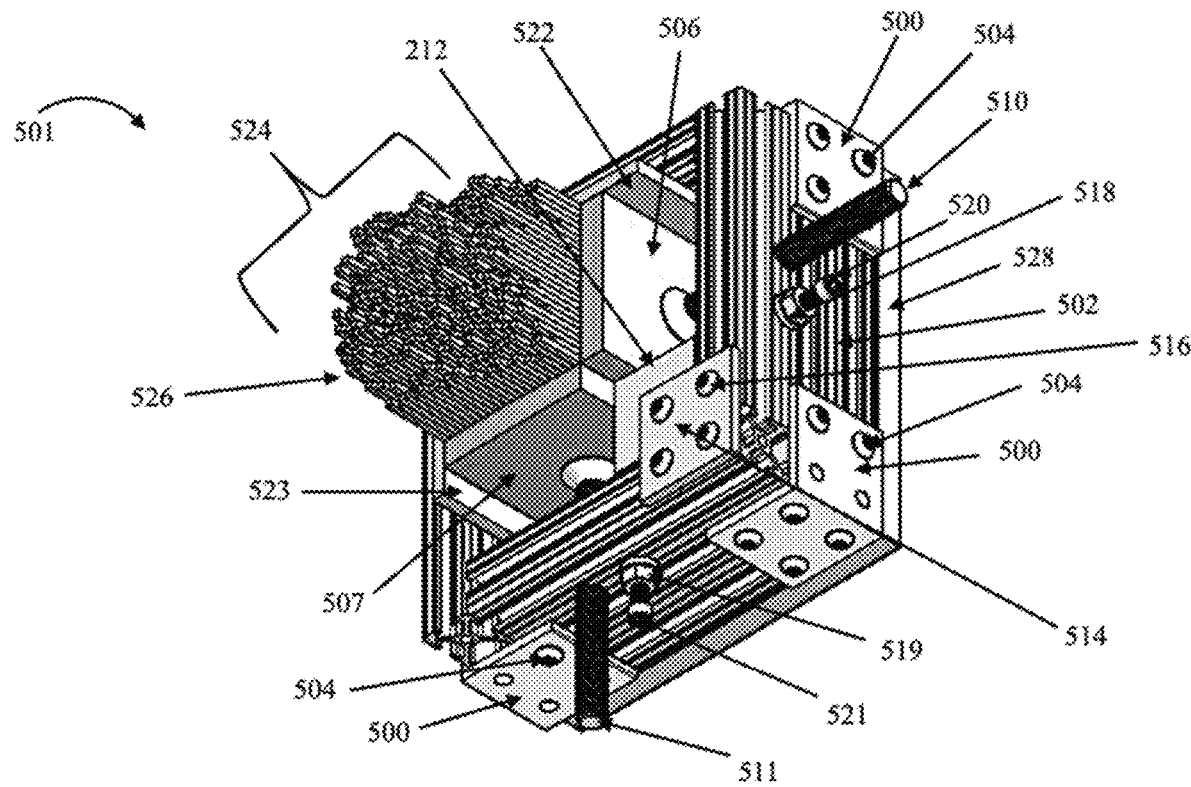
FIG. 5 is an isometric view of the reusable molding device, including a diaphragm, in accordance with an embodiment of the invention.

Reusable molding devices may also include a mold volume diaphragm and a plurality of pressure release stop pins in various configurations for creating molds. An isometric view of a reusable molding device in accordance with an embodiment of the invention is illustrated in FIG. 5. The reusable molding device 501 may include an array 524 that includes a plurality of individual pixel pins 526 that may be configured linearly to create a mold. In many embodiments, the array 524 may be connected to a first pixel guide plate 522 and a second pixel guide plate 523 to retain the array 524 when using the molding device 501 to create a mold. In some embodiments, the first pixel guide plate 522 may be positioned adjacent to the second pixel guide plate 523. The array 524 may also be connected to a first clamp pressure plate 506 and a second clamp pressure plate 507, both of which may apply pressure to its respective side of the array 524 to secure the placement of the individual pixel pins 526 after a mold impression has been created, as further described below. In some embodiments, the first clamp pressure plate 506 may be positioned adjacent to the second clamp pressure plate 507.

In reference to FIG. 5, a first clamp screw 510 may be connected to the first clamp pressure plate 506 to control the amount of pressure applied or released on the first clamp pressure plate 506. For example, pressure may be applied to the first clamp pressure plate 506 by tightening the first clamp screw 510. In some embodiments, applying pressure to the first clamp pressure plate 506 may apply pressure to the array 524. Further, pressure may be released on the first clamp pressure plate 506 by loosening the first clamp screw 510. In numerous embodiments, releasing pressure on the first clamp pressure plate 506 may release pressure on the array 524. In various embodiments, the amount of pressure released on the first clamp pressure plate 506 may be set or restricted by a first pressure release stop pin 520. A first pressure release stop pin locknut 518 may be connected to the pressure release stop pin 520 to retain the pressure release stop pin 520 and allow for release pressure adjustments. Additionally, in various embodiments, a second clamp screw 511 may be connected to a second clamp pressure plate 507 to control the amount of pressure applied or released on the second pressure plate 507. For example, pressure may be applied to the second clamp pressure plate 507 by tightening the second clamp screw 511. In some embodiments, applying pressure to the second clamp pressure plate 507 may apply pressure to the array 524. Further, pressure may be released on the second clamp pressure plate 507 by loosening the second clamp screw 511. In numerous embodiments, releasing pressure on the second clamp pressure plate 507 may release pressure on the array 524. In many embodiments, the amount of pressure released on the second clamp pressure plate 507 may be set or restricted by a second pressure release stop pin 521. A second pressure release stop pin locknut 519 may be connected to the pressure release stop pin 521 to retain the pressure release stop pin 521 and allow for release pressure adjustments.

In further reference to FIG. 5, the molding device 501 may also include a guide block 512, located between the first clamp pressure plate 506 and the second clamp pressure plate 507, to control the linear movement of the first clamp pressure plate 506 and the second clamp pressure plate 507. In some embodiments, the guide block 512 may be secured by a clamp guide block bracket 514 using a plurality of bracket screws 516. In numerous embodiments, the molding device 501 may also include a pressure clamp frame 502, secured by a plurality of frame corner brackets 500 with a plurality of frame screws 504, that enclose the array 524 and support the first clamp screw 510, the first pressure release stop pin 520, the second clamp screw 511, and the second pressure release stop pin 521. The molding device 501 may also include a removable top pressure plate 528 connected to the pressure clamp frame 502.

Figure 6:
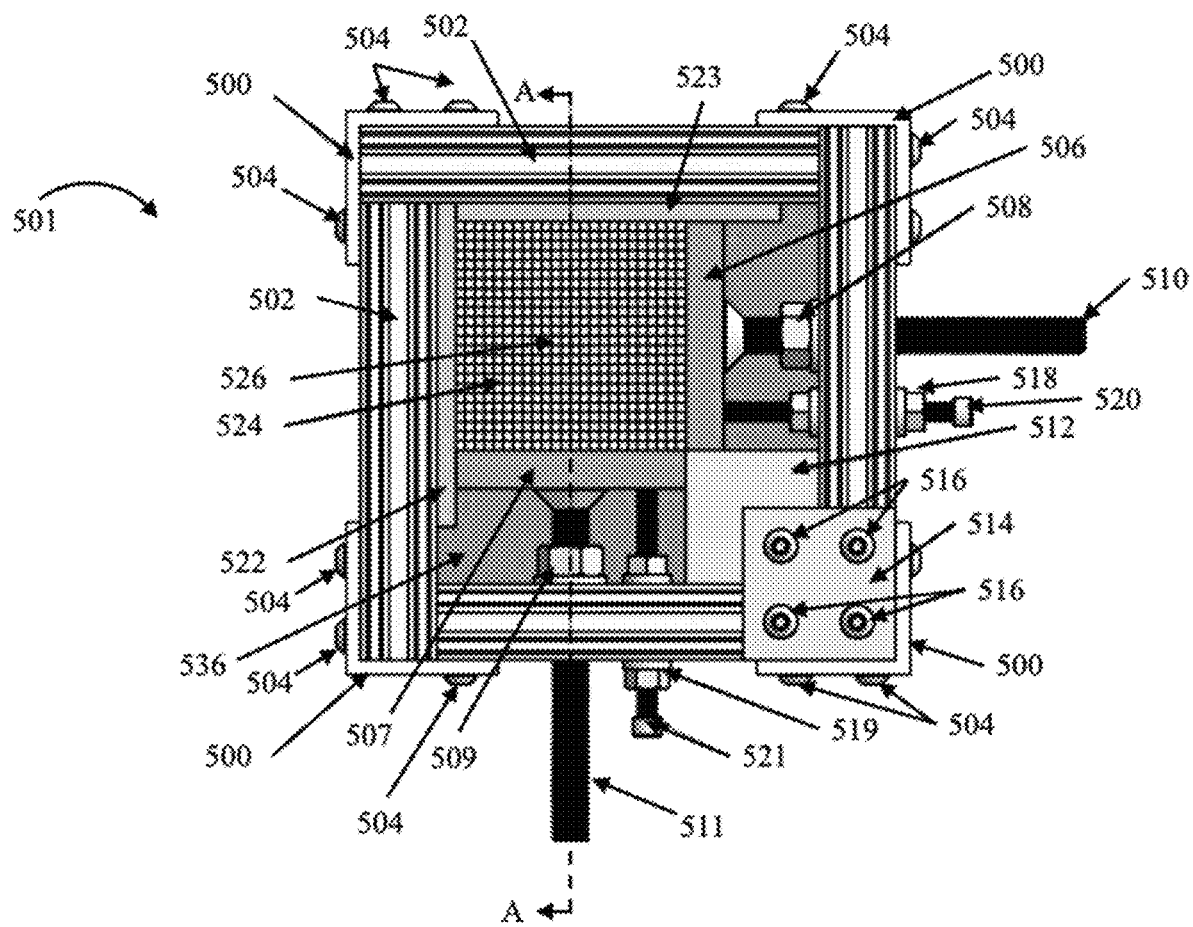
FIG. 6 is a bottom view of the reusable molding device, including the diaphragm, in accordance with an embodiment of the invention.

A bottom view of the reusable molding device along an A-A axis in accordance with an embodiment of the invention is illustrated in FIG. 6. In many embodiments, the array 524 may be configured in a neutral position where the individual pins 526 are aligned to make the array 524 flat and planar. Additionally, the array 524 may be configured in a shifted position where the individual pixel pins 526 are aligned in varying levels to create a mold impression in the array of an object. The individual pixel pins 526 may be shifted as a result of the object being impressed into the array 524 in order to create a negative image of the side of the object impressed. Furthermore, the individual pixel pins 526 may be electronically calibrated into a shifted position to create a negative image of one side of the object. The negative image created from the shifted position of the individual pixel pins 526 is an image of a portion or side of an object and does not create an entire negative image of the object. The individual pixel pins 526 may be of varying sizes, thickness, and shape to maximize surface area of the array 524. For example, the array 524 may include individual pixel pins 526 that are angular in shape or circular in shape. The individual pixel pins 526 may be of conventional material, including, but not limited to plastic material, to avoid rusting, and metal material, such as stainless steel. In several embodiments the first pixel guide plate 522 and the second pixel guide plate 523 may be stationary to keep the array 524 secure. In various embodiments, the first clamp screw 510 may be connected by a first screw locknut 508 to regulate the amount of pressure the first clamp screw 510 applies to the first clamp pressure plate 506. Furthermore, the second clamp screw 511 may be connected to a second clamp screw locknut 509 to regulate the amount of pressure the second clamp screw 511 applies to the second clamp pressure plate 507. In various embodiments, the first pressure release stop pin 520 may regulate the amount of pressure released from the first clamp pressure plate 506 to adjust or re-shape the array 524. The first pressure releases stop pin 520, connected by the first pressure release stop pin locknut 518, may allow a minimum pressure to be applied to the array 524 when resetting the individual pixel pins 526 in the array 524. In numerous embodiments, the second pressure release stop pin 521 may regulate the amount of pressure released from the second clamp pressure plate 507 to adjust or re-shape the array 524. The second pressure release stop pin 521, connected by the second pressure release stop pin locknut 519, may allow a minimum pressure to be applied to the array 524 when resetting the individual pixel pins 526 in the array 524.

In reference to FIG. 6, the clamp guide block 512, secured by the clamp guide block bracket 514 with a plurality of bracket screws 516, may be stationary to guide the respective linear movements of the first clamp pressure plate 506 and the second clamp pressure plate 507. In several embodiments, the pressure clamp frame 502, which may be secured by a plurality of frame corner brackets 500 with a plurality of frame screws 504, may further enclose the first pixel guide plate 522, the second pixel guide plate 523, the first clamp pressure plate 506, the second clamp pressure plate 507, and the clamp guide block 512. In numerous embodiments, a mold volume diaphragm 536 may be connected to the molding device 501 when the top pressure plate is connected to the molding device 501 to prevent molding material injected into the mold volume from entering into voids between the individual pixel pins 526 in the array 524.

Figure 7:
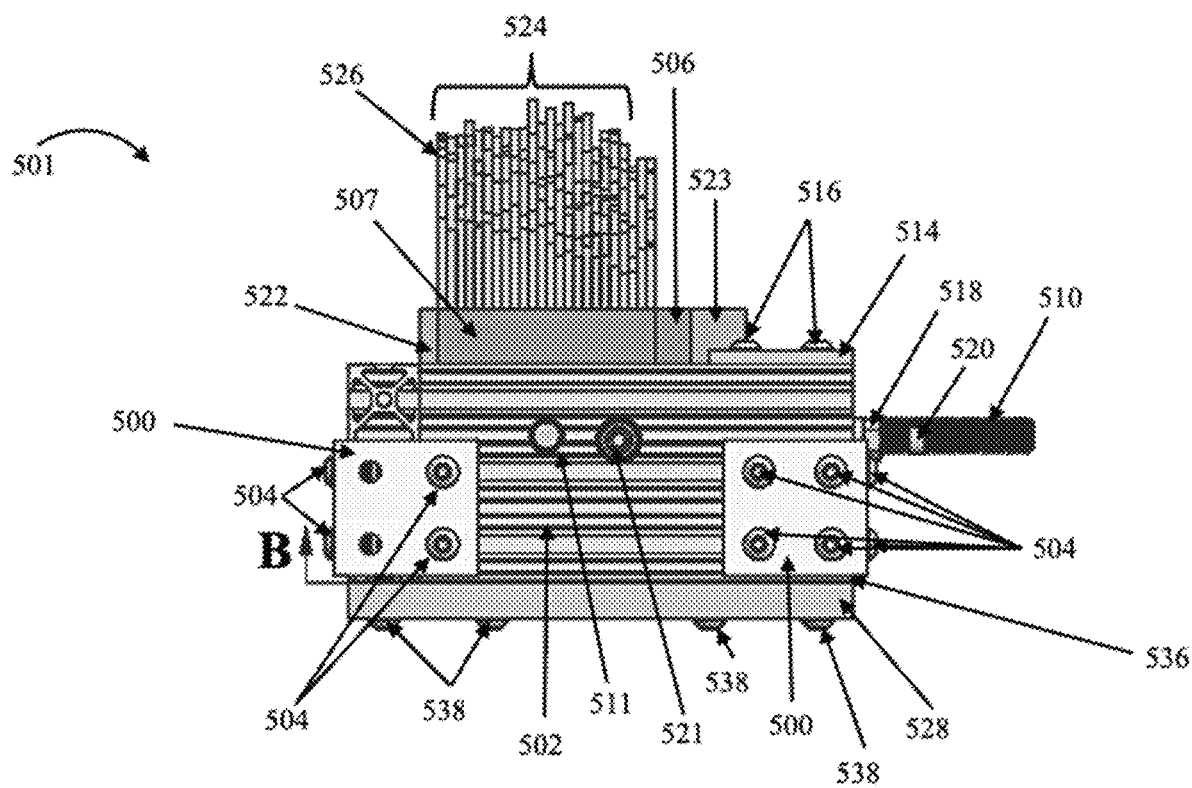
FIG. 7 is a side view of the reusable molding device, including the diaphragm, in accordance with an embodiment of the invention.

A side perspective view of the reusable molding device in accordance with an embodiment of the invention is illustrated in FIG. 7. In many embodiments, the individual pixel pins 526 in a shifted position in the array 524 may protrude beyond the bottom of the molding device 501. The first pixel guide plate 522, the second pixel guide plate 523, the first clamp pressure plate 506, and the second clamp pressure plate 507 collectively create the bottom of the molding device 501, from which the individual pixel pins 526 may protrude outwardly beyond the external side of each respective plate. In various embodiments, the clamp guide block bracket 514, secured by the plurality of bracket screws 516, may be connected to the bottom side of the pressure clamp frame 502 to retain the guide block in a stable position at a corner of the clamp frame 502. In numerous embodiments, the pressure clamp frame 502 may encompass the first clamp screw 510, the first pressure release stop pin 520, and its corresponding first pressure release stop pin locknut 518. In various embodiments, the pressure clamp frame 502 may also encompass the second clamp screw 511, the second pressure release stop pin 521, and its corresponding second pressure release stop pin locknut 519. In numerous embodiments, the plurality of frame corner brackets 500 may be connected to the pressure clamp frame 502 with the plurality of frame screws 504 to retain the stable structure of the pressure clamp frame 502. In various embodiments, the mold volume diaphragm 536 may be connected to the top pressure plate 528 where the mold volume diaphragm 536 may reduce impressions left in the molding material that may be caused by the individual pixel pins 526. In some embodiments, the mold volume diaphragm 536 may function to smooth the surface of the molding material when it is injected into the mold volume in the array 524. In many embodiments, a plurality of top pressure screws 538 may be used to connect the top pressure plate 528, along with its attached mold volume diaphragm 536, to the molding device 501.

Although specific reusable molding devices with pressure release stop pins are discussed above with respect to FIGS. 5-7, any of the variety of reusable molding devices with pressure release stop pins, including a variety of array, clamp screws, pressure plate and guide plate positions, as appropriate to the requirements of a specific application, can be utilized in accordance with embodiments of the invention. Reusable molding devices with diaphragms in accordance with embodiments of the invention are further discussed below.

Reusable Molding Devices with Diaphragms

Figure 8:
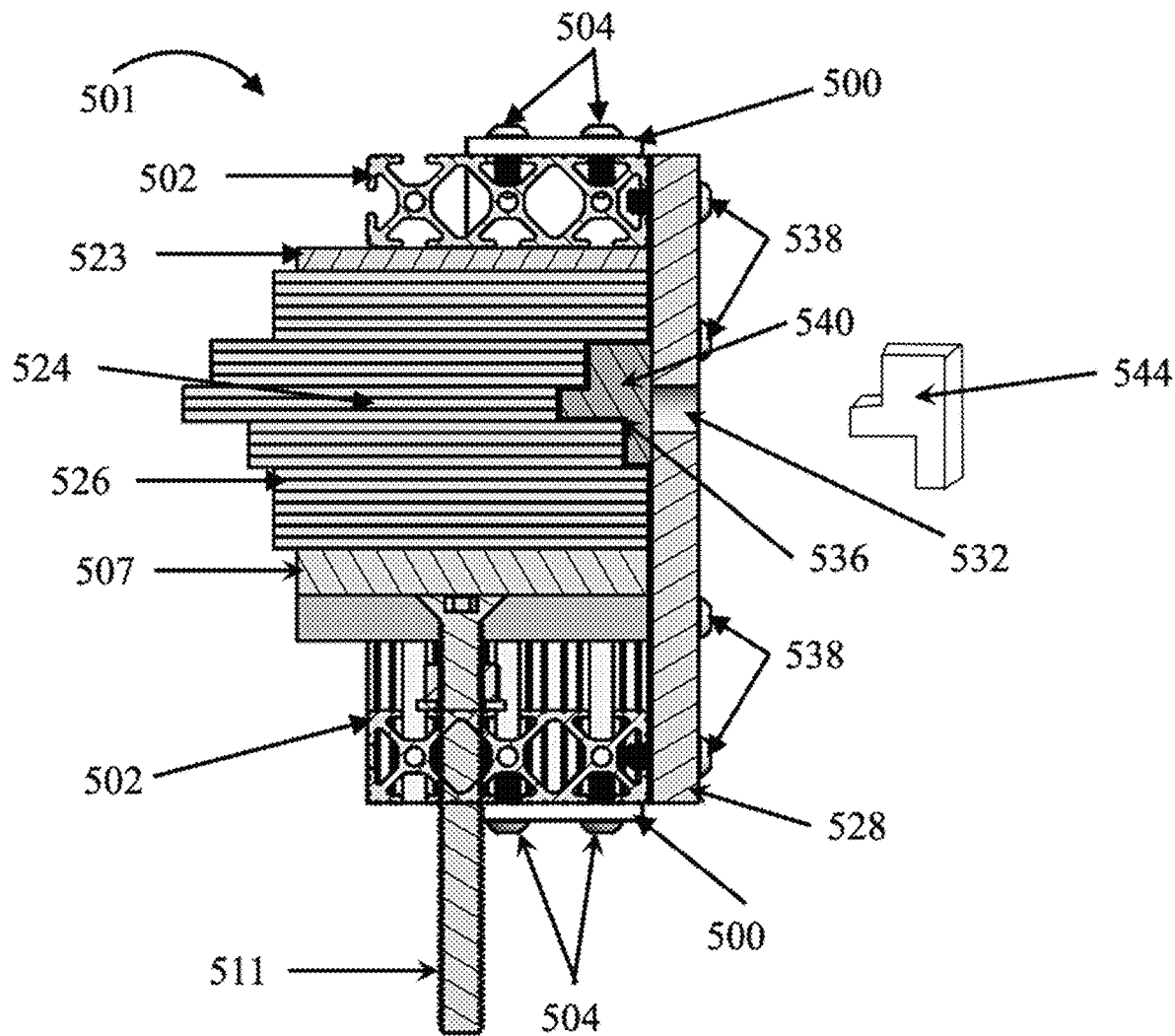
FIG. 8 is a cross-sectional view, along the A-A axis, of the reusable molding device, including the diaphragm, in accordance with an embodiment of the invention.

In many embodiments, reusable molding devices may include a mold volume diaphragm and a plurality of pressure release stop pins in various configurations for creating molds. A cross-sectional view of a reusable molding device, along the A-A axis, with the array in a shifted position, including the diaphragm and the molding material, in accordance with an embodiment of the invention, is depicted in FIG. 8. In several embodiments, the molding device 501 may be bounded by the pressure clamp frame 502 which may be held together by a plurality of frame corner brackets 500. In many embodiments, the plurality of frame corner brackets 500 may be attached to the pressure clamp frame 502 by screwing in the plurality of frame screws 504 for each of the frame corner brackets 500. In some embodiments, the second clamp screw 511 may be slotted through the pressure clamp frame 502 to extend from outside the pressure clamp frame 502 to inside the pressure clamp frame 502 towards the center of the molding device 501. The second clamp screw 511 may extend through the pressure clamp frame 502 and come into contact with the second clamp pressure plate 507. In many embodiments, the second clamp pressure plate 507 may interface with the array 524 and the second clamp screw 511. For example, in some embodiments, the second clamp pressure plate 507 may interface with the array 524 on one side and the second clamp screw 511 on an opposite side of the second clamp pressure plate 507. In other words, the array 524 of individual pixel pins 526 may be on the opposite side of the second clamp pressure plate 507 than the side which may contact the second clamp screw 511. In several embodiments, opposite to the side where the array 524 may interface with second clamp pressure plate 507, and the array 524 may further interface with the second pixel guide plate 523. In some embodiments, the second pixel guide plate 523 may interface with another side of the pressure clamp frame 502 on an opposite side to the second pixel guide plate's 523 connection with the array 524. In many embodiments, the individual pixel pins 526, the second clamp pressure plate 507, the second pixel guide plate 523, and the pressure clamp frame 502 may be parallel to each other.

In reference to FIG. 8, the molding device 501 may further include the mold volume diaphragm 536, which may be connected to the molding device 501 in various ways. For example, the mold diaphragm 536 may be connected into the pressure clamp frame 502 when the top pressure plate 528 is connected to the pressure clamp frame 502 using a plurality of top pressure plate screws 538. In numerous embodiments, the mold volume diaphragm 536 may be connected to the top pressure plate's 528 internal side (that is, the side that may be connected to the pressure clamp frame 502) using a thermostable glue, or other adhesive. Such connection may be done by bonding all the edges of the mold volume diaphragm 536 to the top pressure plate 528 so as to leave the mold volume diaphragm 536 free to expand but for its edges to remain sealed. In some embodiments, the top pressure plate 528 may be connected the pressure clamp frame 502 by screwing in a plurality of top pressure plate screws 538. In many embodiments, the array 524 may be placed in a shifted position, whereby each individual pixel pin 526 may be positioned in order to form a mold volume similarly to as described above in FIG. 4B and FIG. 4C.

In further reference to FIG. 8, the array's 524 shifted position may be shifted based on the shape of an object. In numerous embodiments, a molding material 540 may be inserted into the molding device 501 through the injection entrance bore 532. The molding material 540 may push against the molding volume diaphragm 536 as the molding material 540 fills up the mold volume space. In some embodiments, the molding volume diaphragm 536 may expand to smooth the interfaces between the mold volume and the array 524 and the molding material 540 and the array 524. The mold volume diaphragm 536 may reduce impressions left in the molding material 540 caused by the individual pixel pins 526 in the array 524. In many embodiments, the mold volume diaphragm 536 may prevent the molding material 540 from entering into voids between each of the plurality of pixel pins 526 in the array 524. The molding material 540 may set to create a facsimile of an object, thus resulting in the molded object 544.

Figure 9A:
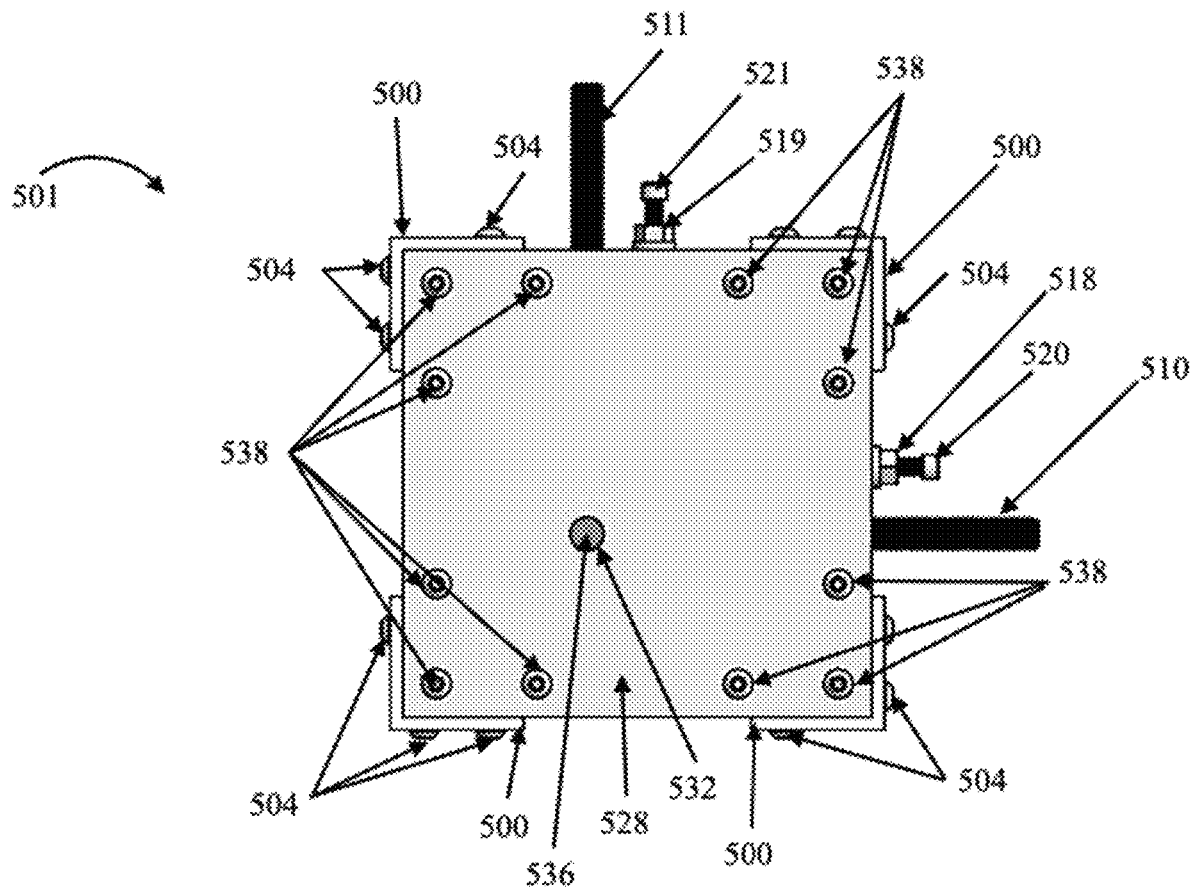
FIG. 9A is a top view of the reusable molding device, including the diaphragm, in accordance with an embodiment of the invention.

A top perspective view of the reusable molding device, including the diaphragm and stop pin locknuts in accordance with an embodiment of the invention is illustrated in FIG. 9A. In many embodiments, each of the four corners of the molding device 501 may be bounded by a plurality of frame corner brackets 500, one for each corner. In some embodiments, the frame corner brackets 500 may be connected to the pressure clamp frame by screwing in the plurality of frame screws 504 for each of the frame corner brackets 500. In various embodiments, the first clamp screw 510 and first pressure release stop pin 520 may be partially visible on a side of the molding device 501, as both the first clamp screw 510 and first pressure release stop pin 520 may protrude beyond the edges of the pressure clamp frame. In several embodiments, the second clamp screw 511 and second pressure release stop pin 521 may be partially visible on a side of the molding device 501 that is adjacent to the one from which the first clamp screw 510 and first pressure release stop pin 520 may protrude. Both the second clamp screw 511 and second pressure release stop pin 521 may protrude beyond the edges of the pressure clamp frame. In numerous embodiments, the first pressure release stop pin locknut 518 may be connected to the first pressure release stop pin 520 as discussed above. In some embodiments, the second pressure release stop pin locknut 519 may be connected to the second pressure release stop pin 521 as discussed above.

In reference to FIG. 9A, the top pressure plate 528 may be connected to the top of the molding device 501 using various methods including, but not limited to, screwing in a plurality of top pressure plate screws 538. Connecting the top pressure plate 528 may include screwing in a plurality of pressure plate screws 538 in each corner of the top pressure plate 528, in order to connect it to the pressure clamp frame 502. In several embodiments, the top pressure plate 528 may include at least one injection entrance bore 532, through which molding material may be injected into the molding device 501. In some embodiments, the mold volume diaphragm 536 may be visible through the injection entrance bore 532.

Figure 9B:
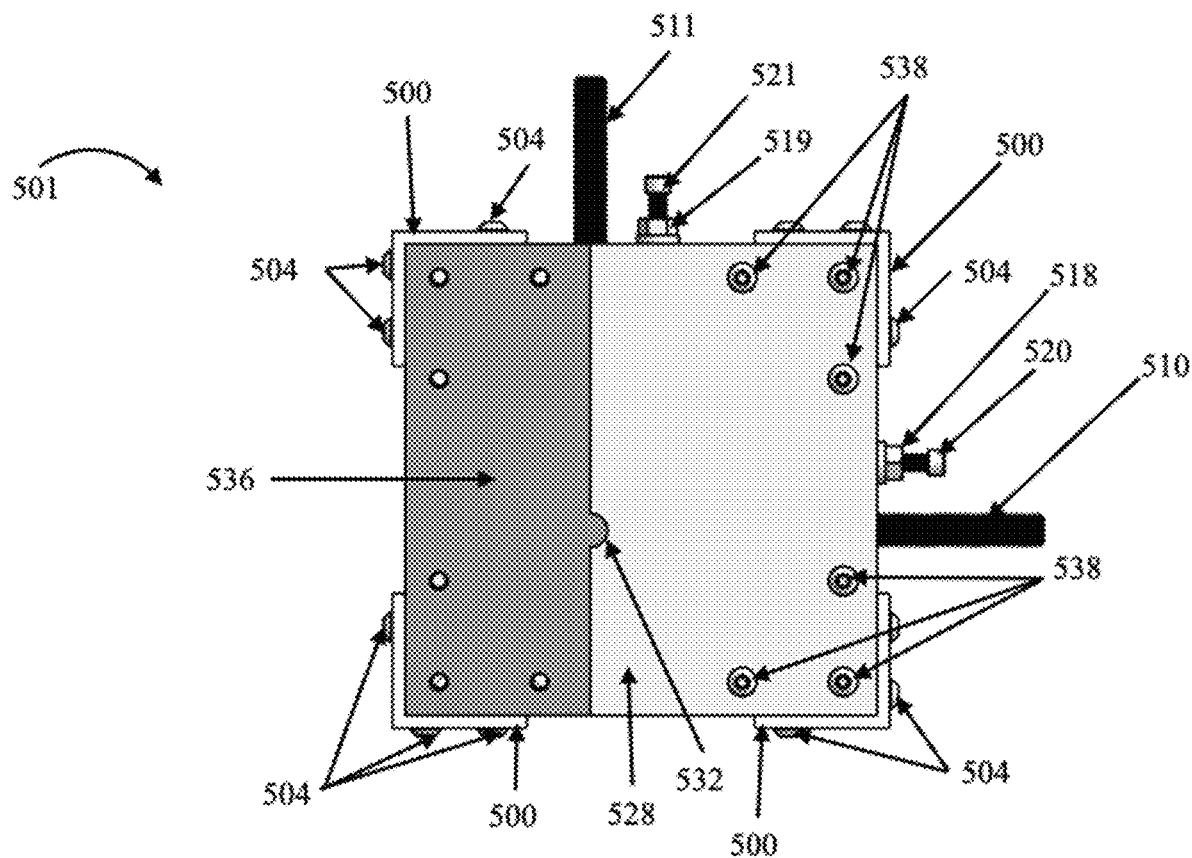
FIG. 9B is a top view, cut long a line B, of the reusable molding device, including the diaphragm, in accordance with an embodiment of the invention.

A top perspective view of the reusable molding device, including the diaphragm and stop pin locknuts in accordance with an embodiment of the invention, with a cut-out along line B, is illustrated in FIG. 9B. In many embodiments, the plurality of frame corner brackets 500, the plurality of frame screws 504, the first pressure clamp screw 510, the second pressure clamp screw 511, the first pressure release stop pin 520, the second pressure release stop pin 521, the first pressure release stop pin locknut 518, the second pressure release stop pin locknut 519, the top pressure plate 528, the top pressure plate screws 538, and the injection entrance bore 132 may be positioned as discussed above in FIG. 9A. In reference to FIG. 9B, the top pressure plate 528 can be seen with a cut out along line B (see FIG. 7). In many embodiments, the mold volume diaphragm 536 may be connected to the molding device 501 by being placed between the top pressure plate 528 and the top side of the pressure clamp frame so that it covers the side of the molding device 501 where a mold volume of an object impression is made. For example, the mold volume diaphragm 536 may be stretched across the interior surface area of the top pressure plate 528 prior to the top pressure plate 528 being connected to the molding device 501.

Although specific configurations of reusable molding devices and their uses are discussed above with respect to FIGS. 8-9B, any of a variety of configurations including a variety of array, clamp screw, pressure release stop pin, pressure release stop pin locknut, and diaphragm positions, as appropriate to the requirements of a specific application, may be used in accordance with embodiments of the invention. Processes for the reusable molding devices in accordance with embodiments of the invention are further discussed below.

Processes for Reusable Molding Devices

Figure 10A:
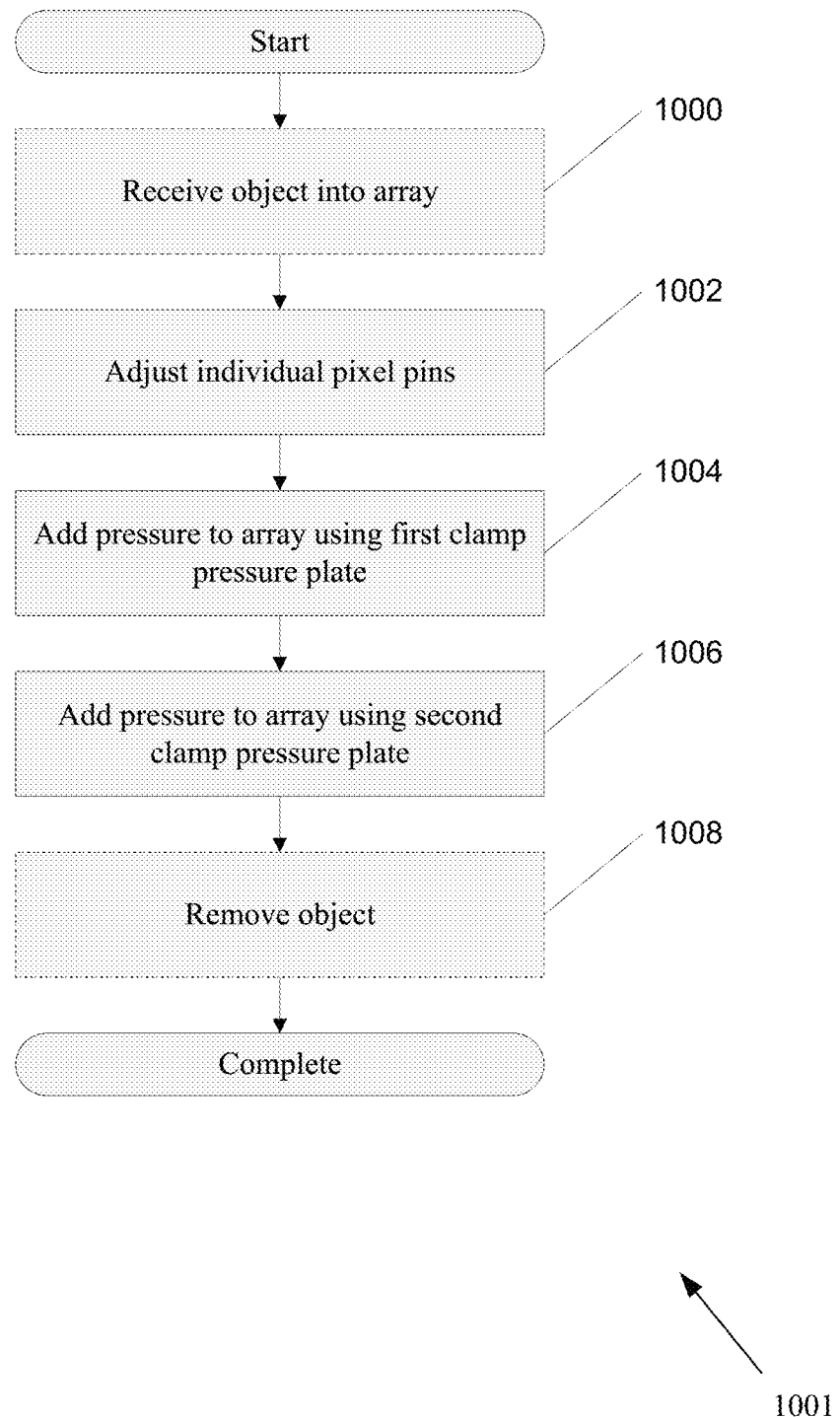
FIG. 10A illustrates a process for making a mold of an object in accordance with various embodiments of the invention.

In many embodiments, reusable molding devices may be configured for various movements, including that not limited to, moving the pixel pins, setting the array, injecting molding material, removing a molded object, and/or resetting the array. A process for making a mold of an object in accordance with an embodiment of the invention is shown in FIG. 10A. The process 1001 may include receiving (1000) an object 142 into the array 124, 524. In some embodiments, receiving (1000) the object 142 may shift the individual pixel pins 126, 526 linearly 134, 534, as further described above. In many embodiments, the process 1001 may not include receiving (1000) the object 142. The process 1001 may further include adjusting (1002) the individual pixel pins 126, 526. For example, adjusting (1002) the individual pixel pins 126, 526 may be made by manually (e.g., by hand) and/or automatically (e.g., through an automated system) where individual pixel pins 126, 526 may be moved linearly 134, 534 based on digital instructions from a computer. In addition, the process 1001 may also include adding (1004) pressure to the array 124, 524 using the first clamp pressure plate 106, 506. In some embodiments, adding (1004) pressure to the array 124, 524 using the first clamp pressure plate 106, 506 may assist in setting the array 124, 524, and to keep the individual pixel pins 126, 526 in place. The process 1001 may also include adding (1006) pressure to the array 124, 524 using the second clamp pressure plate 107, 507. In some embodiments, adding (1006) pressure to the array 124, 524 using the second clamp pressure plate 107, 507 may assist in setting the array 124, 524, and may keep the individual pixel pins 126, 526 in place. In some embodiments, the process 1001 may also include removing (1008) the object 142 from the array 124, 524.

Figure 10B:
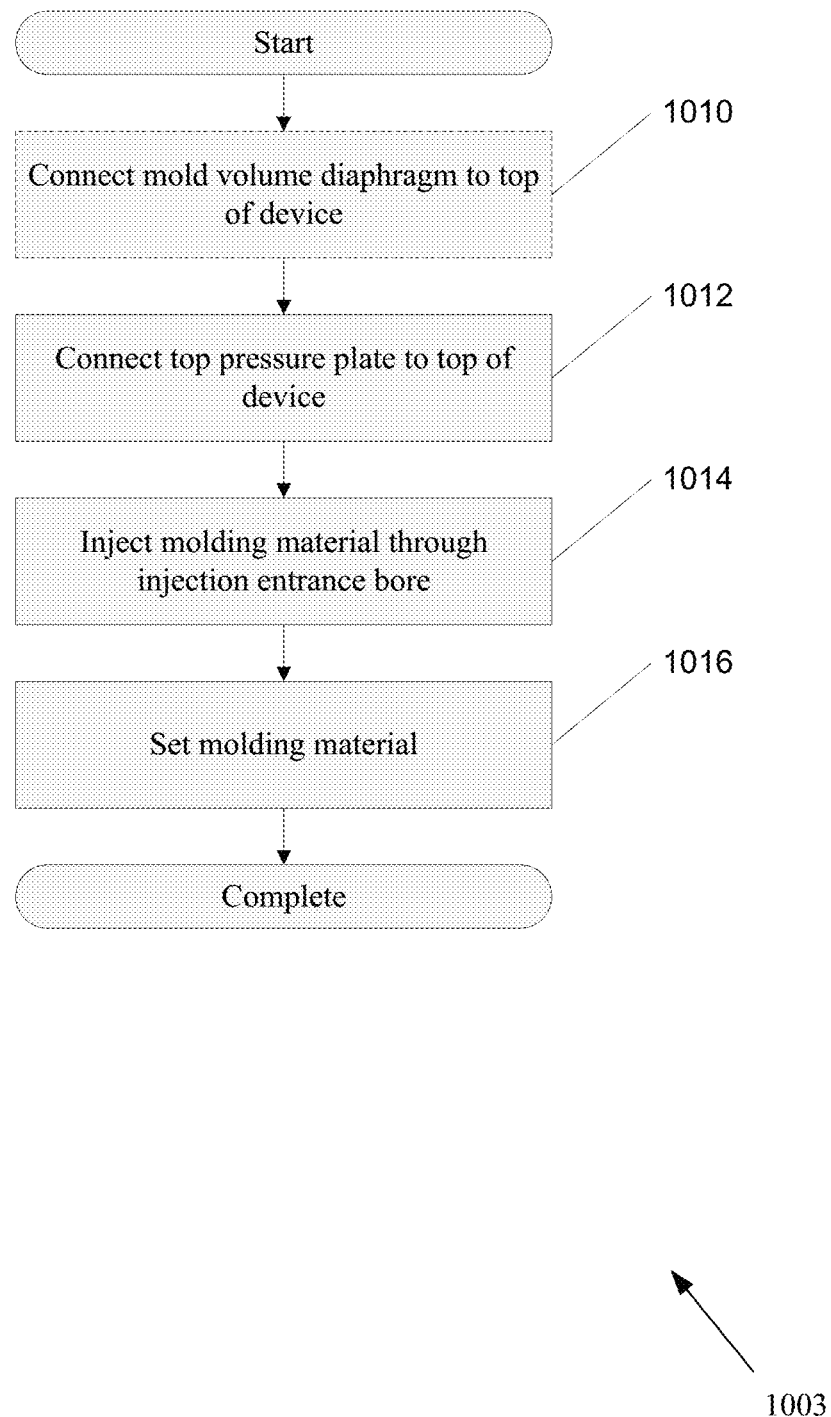
FIG. 10B illustrates a process for enclosing the mold volume and injecting the molding material, in accordance with various embodiments of the invention.

A process for enclosing the mold volume and injecting the molding material in accordance with an embodiment of the invention is depicted in FIG. 10B. The process 1003 may include connecting (1010) the mold volume diaphragm 536 to the top of the molding device 101, 501. In some embodiments, connecting (1010) the mold volume diaphragm 536 may enclose the mold volume 130, 530. The mold volume diaphragm 536 may be connected (1010) using various implements including, but not limited to, a one or more top pressure plate screws 138, 538. The process 1003 may further include connecting (1012) the top pressure plate 128, 528 to the top of the molding device 101, 501. In various embodiments, connecting (1012) the top pressure plate 128, 528 may enclose the mold volume 130, 530. The top pressure plate 128, 528 may be connected (1012) using various implements including, but not limited to, a plurality of pressure plate screws 138, 538. In some embodiments, the top pressure plate 128, 528 may include the injection entrance bore 132, 532, and the process 1003 may include injecting (1014) molding material 540 through the injection entrance bore 132, 532. The process 1003 may also include setting (1016) the molding material 540 to create the molded object 544. The molding material 540 may be set (1016) in various ways depending on the properties of the molding material 540 used. For example, setting (1016) the molding material may include, but is not limited to, setting (1016) a thermoplastic molding material 540 using heat, or setting (1016) a liquid molding material 540 by allowing for it to solidify, etc. In many embodiments, setting (1016) the molding material 540 may result in the molding material 540 transforming into the molded object 544.

Figure 10C:
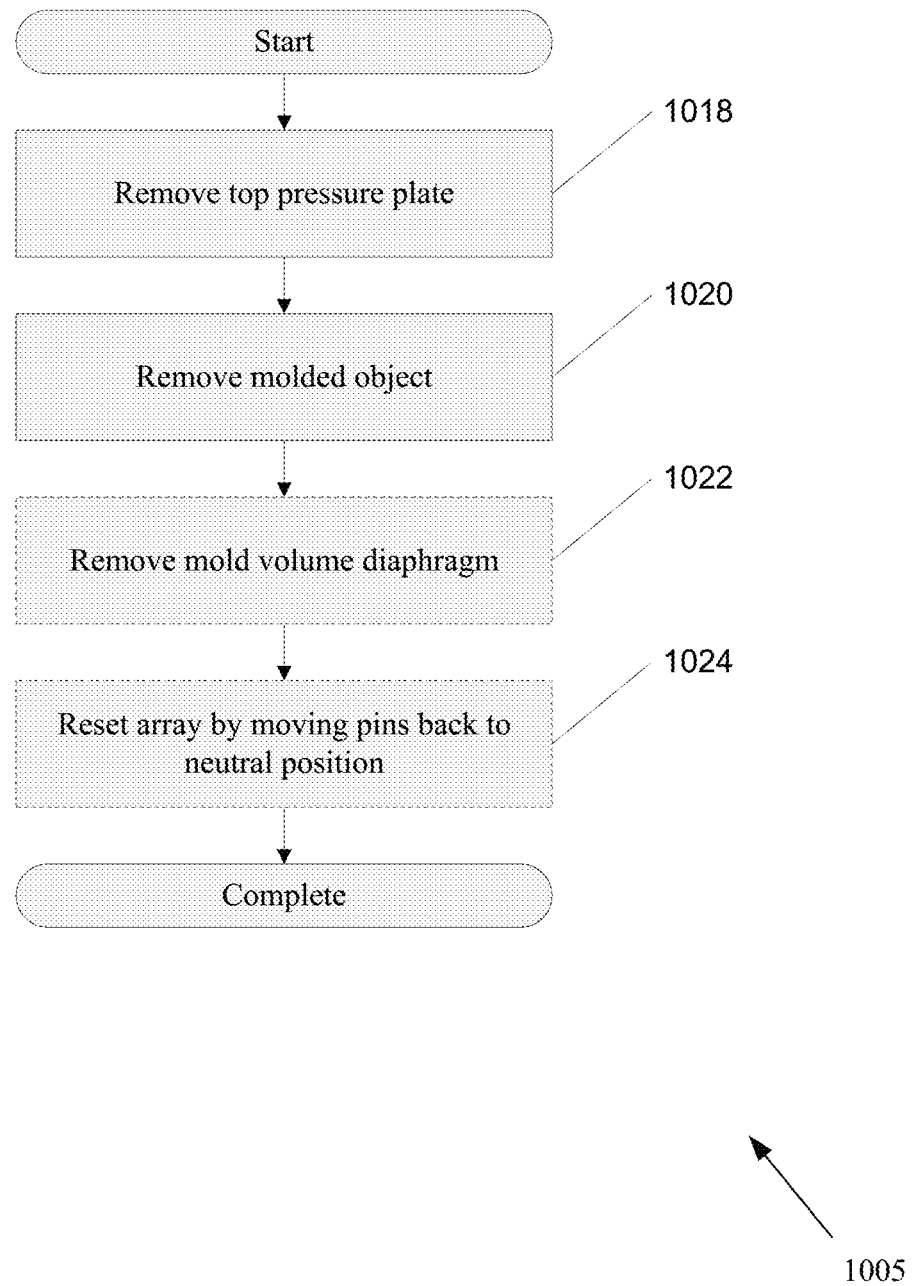
FIG. 10C illustrates a process for removing the molded object and resetting the array, in accordance with various embodiments of the invention.

A process for removing the molded object and resetting the array in accordance with an embodiment of the invention is illustrated in FIG. 10C. The process 1005 may include removing (1018) the top pressure plate 128, 528 from the top of the molding device 101, 501. Such a removal (1018) may include unscrewing a plurality of top pressure plate screws 138, 538. In several embodiments, the molded object 544 may be removed (1020) from the molding device 101, 501 by pulling it out, for example by hand. Alternatively, the removal (1020) may be achieved by shifting the individual pixel pins 126, 526 linearly 134, 534 towards the top of the molding device 101, 501 to push the molded object 544 out of the array 124, 524. In some embodiments, the removal (1020) may include shifting the individual pixel pins 126, 526 manually (e.g., by hand or machine) and/or automatically (e.g., through an automated system) in which individual pixel pins 126, 526 may be moved linearly 134, 534 based on digital instructions from a computer. Further the process 1005 may include removing (1022) the mold volume diaphragm 536 from the molding device 501. Such a removal (1022) may include unscrewing a plurality of top pressure plate screws 138, 538. In some embodiments, removing (1022) the mold volume diaphragm 536 may be done simultaneously to removing (1020) the molded object 544 by pulling or pushing the mold volume diaphragm 536 off the molding device 101, 501 along with the molded object 544. In addition, the process 1005 may include resetting (1024) the molding device 101, 501 by linearly 134, 534 adjusting the individual pixel pins 126, 526 to a neutral position (shown in FIG. 4A).

Although specific processes for reusable molding devices are discussed above with respect to FIGS. 10A-10C, any of a variety of processes for molding device as appropriate to the requirements of a specific application can be utilized in accordance with embodiments of the invention. While the above description includes many specific embodiments of the invention, these should not be construed as limitations on the scope of the invention, but rather as an example of one embodiment thereof. Therefore, it is to be understood that the present invention may be practiced otherwise than specifically described, without departing from the scope and spirit of the present invention. Thus, embodiments of the present invention should be considered in all respects as illustrative and not restrictive.

What is claimed is:

1. A reusable molding device for producing three-dimensional (3D) molds, the reusable molding device comprising:
    an array comprising a plurality of pixel pins, wherein the plurality of pixel pins is arranged to form a two-dimensional plane and wherein each one of the plurality of pixel pins is linearly movable to create an impression of a surface of an object;
    a first pixel guide plate connected to the array, wherein the first pixel guide plate provides support to a first side of the array;
    a second pixel guide plate connected to the array, wherein the second pixel guide plate supports a second side of the array, wherein the second side of the array is adjacent to the first side of the array;
    a first clamp pressure plate configured to apply pressure to a third side of the array, wherein the first clamp pressure plate is opposite the first pixel guide plate;
    a second clamp pressure plate configured to apply pressure to a fourth side of the array, wherein the second clamp pressure plate is opposite the second pixel guide plate;
    a first clamp screw connected to the first clamp pressure plate, wherein the first clamp screw moves the first clamp pressure plate in a first direction towards the first side of the array and moves in an opposite second direction away from the first side of the array;
    a second clamp screw connected to the second clamp pressure plate, wherein the second clamp screw moves the second clamp pressure plate in a third direction towards the second side of the array and moves in an opposite fourth direction away from the second side of the array;
    a pressure clamp frame enclosing the first and second pixel guide plates and the first and second clamp pressure plates, wherein the pressure clamp frame is connected to the first clamp screw, the second clamp screw, and a clamp guide block; and
    a top pressure plate connected to the pressure clamp frame, wherein the top pressure plate includes an injection entrance bore through which to pour in a molding material.

2. The reusable molding device of claim 1, wherein each pixel pin of the plurality of pixel pins is a prism to fit tightly next to its surrounding pixel pins.

3. The reusable molding device of claim 1, wherein each pixel pin of the plurality of pixel pins is of varying sizes to fit tightly next to its surrounding pixel pins.

4. The reusable molding device of claim 1, wherein the array and the top pressure plate are separated by a mold volume diaphragm.

5. The reusable molding device of claim 1, further comprising a first pressure release stop pin connected to the first clamp pressure plate.

6. The reusable molding device of claim 1, further comprising a second pressure release stop pin connected to the second clamp pressure plate.

7. The reusable molding device of claim 1, wherein the clamp guide block controls the linear movement of the first clamp pressure plate and the second clamp pressure plate, and the clamp guide block is between the first clamp pressure plate and the second clamp pressure plate.

8. The reusable molding device of claim 1, further comprising a clamp guide block bracket connected to the clamp guide block, wherein the clamp guide block bracket is secured by at least one bracket screw.

9. The reusable molding device of claim 1 further comprising at least one frame corner bracket, wherein the at least one frame corner bracket is connected to the pressure clamp frame.

10. The reusable molding device of claim 1, wherein the top pressure plate is removable.

* * * * *